United States Patent [19]

Abell

[11] 4,397,298
[45] Aug. 9, 1983

[54] UTENSIL FOR COOKING FOOD BY STEAMING

[76] Inventor: Anne C. Abell, R.R. 1, Box 202, Perrin Rd., Woodstock, Conn. 06281

[21] Appl. No.: 228,125

[22] Filed: Jan. 26, 1981

[51] Int. Cl.³ .............................................. F24D 1/00
[52] U.S. Cl. .................................. 126/369; 220/468; 126/377
[58] Field of Search ................ 126/377, 369; 165/185; 99/467; 220/428

[56] References Cited

U.S. PATENT DOCUMENTS

| | | | |
|---|---|---|---|
| 1,364,115 | 1/1921 | Kania | 126/377 |
| 1,383,971 | 7/1921 | Biette | 126/377 |
| 1,468,841 | 9/1923 | Smith | 126/377 |
| 2,025,333 | 12/1935 | Richheimer | 126/377 |

Primary Examiner—Ronald C. Capossela
Attorney, Agent, or Firm—Gurdon R. Abell

[57] ABSTRACT

A utensil for cooking food by steaming comprises a boiler and a food holder. In the wall of the food holder is at least one perforation through which steam may pass from the boiler to cook the food. The perforation is arranged to leave a sump, in the bottom of the food holder, in which juice from the cooking food may settle and be collected.

10 Claims, 3 Drawing Figures

UTENSIL FOR COOKING FOOD BY STEAMING

BACKGROUND OF THE INVENTION

This invention relates generally to utensils for cooking food by steaming, and relates particularly to such utensils of the smaller sizes appropriate to household and restaurant cooking.

Cooking food, especially vegetables, by steaming is often preferred to cooking by immersion in boiling water, since the food cooked by steaming may exhibit better appearance, flavor and color, and is often deemed to retain more of the natural vitamins and minerals. These advantages can be ascribed to the fact that the amount of water, condensed upon the food from the ambient steam, is very much less than the amount of water required for simply boiling the food by immersion, and hence extracts a smaller amount of coloring, flavoring or nutrient materials. I have observed that when food is cooked in a conventional steaming utensil of the present designs, it still loses some flavoring and nutrient materials, a fact observable by tasting or reducing the water in the bottom of the utensil.

SUMMARY OF THE INVENTION

It is accordingly the principal object of this invention to provide a utensil for cooking food by steaming with the least overall loss of useful flavoring and nutrient material. It is a further object of this invention to provide a utensil, of the class described, which is simple and effective.

According to this invention, my utensil for steaming food comprises the customary two essential parts: a perforated food holder and a boiler, the food holder supporting food above a quantity of boiling water or other aqueous liquid in the boiler, and the holder and boiler being arranged so that steam from the boiling liquid may pass through at least one perforation in the holder and thereby steam the food. But in my utensil, the perforation of the food holder is so arranged that there is no perforation in the very bottom of the food holder, the lowest perforation being at a distance above the bottom, thereby providing an imperforate sump into which steam-extracted flavoring and nutrient juices may settle and be collected in undiluted form. Other objects of this invention, as well as the means for attaining them, are set forth in the accompanying Specification and Drawings, wherein:

DETAILED DESCRIPTION OF THE INVENTION

Figures 1, 2, 3:
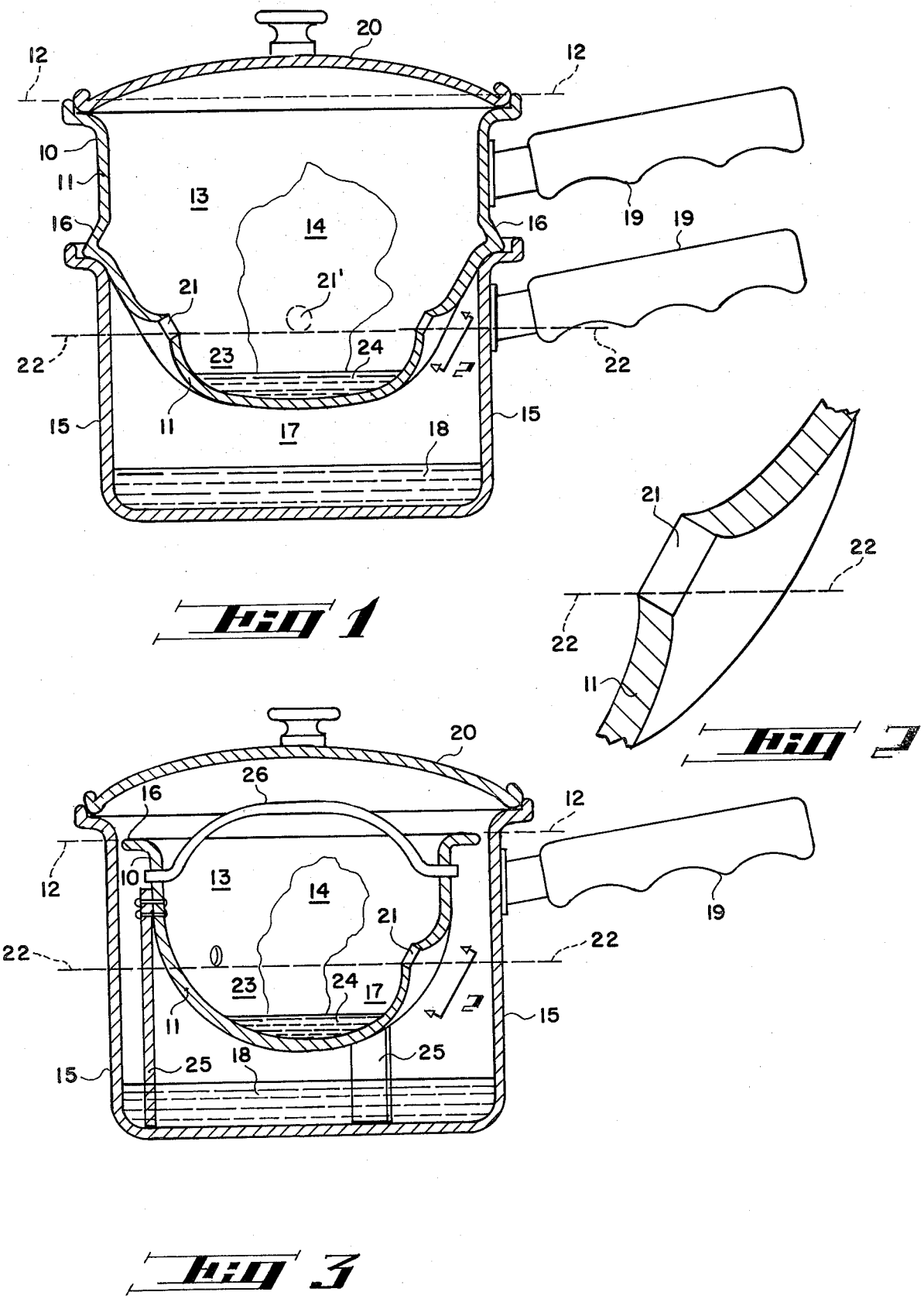
FIG. 1 is a cross-section view of the preferred embodiment of this invention.
FIG. 2 is a fragmentary expanded view of a part of FIG. 1, in the vicinity of the region denoted by 2 in that Figure.
FIG. 3 is a cross-section view of an alternative embodiment of this invention.

As illustrated in FIG. 1, a utensil according to this invention comprises a food holder 10 having a wall 11 extending upward to an upper level indicated by dashed line 12, the wall and the upper level defining a holder volume 13 in which food 14 may be contained and held for cooking. The utensil further comprises a boiler 15 upon which food holder 10 may be placed and supported, expanded portion 16 of food holder 10 sufficing to support food holder 10 upon the top of boiler 15 and also helping to retain steam. Lower region 17 of boiler 15, below food holder 10, contains a quantity of water or other aqueous liquid 18 which may be boiled to produce steam by heat applied to boiler 15 by conventional stove means (not shown). Food holder 10 and boiler 15 may have conventional handles 19, and food holder 10 may be covered by a conventional pot lid 20. It is to be understood that the thickness of wall 11 is exaggerated in the Figures, in the interest of clarity of drawing.

Steam boiled from liquid 18 rises from lower region 17 and passes through perforations 21 in wall 11 to cook food 14 by steaming. Perforations 21 are located above a lower level indicated by dashed line 22, the wall and the lower level defining a sump volume 23. Juices elaborated by food 14, and also steam condensed thereon, may flow down inside wall 11 to settle in sump volume 23 to form a small pool 24 of flavorful and nutritious juice. Since this juice is rather concentrated, not having been diluted by all of liquid 18, it may advantageously be used as an ingredient of soups, sauces or gravies, or be consumed directly, as-is or chilled.

It may be advantageous to form perforations 21 as shown in FIG. 2, which is a fragmentary expanded view of FIG. 1, in the vicinity of the region denoted by 2 in that Figure. As shown in FIG. 2, the material of wall 11 surrounding perforations 21 may be dimpled inward to reduce leakage of juice flowing down the inside of wall 11 of food holder 10, while not projecting into the interior so much as to impede cleaning of food holder 10. Typically, the material of wall 11 may be dimpled inward by a distance of the order of the size of a perforation 21, and the dimpled area of wall 11 may extend around a perforation 21 for a distance of the order of five times that inward distance. It is also advantageous to remove rough or sharp edges from perforations 21.

FIG. 3 illustrates an alternative embodiment of this invention in which food holder 10 is disposed within, rather than being set upon, boiler 15. In this embodiment, food holder 10 is supported, by legs 25 fastened to wall 11, so that it is above aqueous liquid 18. To facilitate removal of food holder 10, one may use a conventional collapsible bail 26 set into holes in wall 11 of food holder 10. Again, an expanded portion 16 of food holder 10 may help to retain steam. The embodiment illustrated in FIG. 3 may produce juice which is slightly more concentrated, since the small amount of water, from steam condensed upon lid 20, would return to boiling aqueous liquid 18 instead of adding to the juice in pool 24. However, the greater ease of handling hot utensils with a handle 19 rather than with a bail 26 leads me to prefer the embodiment illustrated in FIG. 1.

The volume of juice pool 24 in sump volume 23 depends upon the amount and kind of food which is cooked. As an example of a minimum practical amount, a modest load of a wispy unfrozen vegetable may yield a pool volume equal to about 0.1% of the holder volume 13 within food holder 10. This establishes a minimum volume for sump volume 23 and a rule for placement of perforations 21 in wall 11: the lowest part of the lowest perforation must be at a level below which there resides a sump volume 23 which is at least 0.1% of the holder volume 13 of food holder 10. As a contrary example of a large amount of juice, a full and well-packed load of a frozen vegetable such as frozen peas may produce a pool volume of the order of 20% of the holder volume. Preferably, for most practical cases, the lowest part of the lowest perforation should be at a level below which there resides at least 10% of the holder volume.

The placement of the highest perforation 21 in wall 11 is not critical, since the steam will reach all of the food sooner or later. But I prefer that the highest part of the highest perforation be at a level below which there resides less than 50% of the holder volume, in order to facilitate prompt sweep-out of air by the steam, so the whole load cooks for about the same length of time. The total area of perforations 21 is not a critical parameter. Satisfactory operation has been attained using some small holes having a total area of only about 0.3% of the cross-section area of boiler 15, and it is probable that a considerably smaller area could suffice. On the other hand, a very large total area of perforations could be used. For example, all of wall 11, above the level of the lowest perforation 21, could be made as a mesh basket.

WORKING EXAMPLE

A working example, having the arrangement of the preferred embodiment of FIG. 1 was constructed from available stainless-steel kitchenware and was tested repeatedly. Boiler 15 was a standard 7-inch pot. Food holder 10 was constructed by drilling eight 5/32-inch (approximately 4 mm) holes at 45-degree intervals in the lower walls of the upper, round-bottom part of a 7-inch "double boiler", of the kind used for cooking puddings, having a holder volume of 10 cups (approximately 2.4 liters). Those holes, providing perforations 21, were positioned about 1¼ inches (32 mm) above the quasi-hemispherical rounded bottom of the food holder, defining below them a sump volume 23 of about 2¼ cups (0.53 liters), or about 22% of the holder volume 13. Perforations 21 were dimpled inward by about 1/16 inch (1.6 mm). Food holder 10 was provided with a suitable pot lid 20.

This working example was used to steam various foodstuffs and consistently yielded appropriate amounts of concentrated juices of the desired type. It exhibited one minor deficiency as first constructed: two of the eight holes were drilled at the locations marked by dotted circle 21' in FIG. 1, located along radii perpendicular to the line defined by handle 19. These two holes tended to be a nuisance, since they could get in the way of the juice when one wished to tilt the food holder to decant the juice. It would therefore be preferable and advantageous to arrange perforations 21 in such a way that none occur at those two locations, or within a reasonable angle, such as 12 degrees, from those locations.

A food-steaming utensil according to this invention has a surprising but useful feature: it is relatively immune to the unfortunate consequences of letting the boiler boil dry, a too-common accident. Since water 18 in boiler 15 may contain little or not matter extracted from the food 14, there is little to char and stick to the bottom; this minimizes subsequent scouring. Further, for the same reason, little or no acrid fumes are released to give a bitter burnt flavor to the food.

While perforations 21 have been shown as round holes, they may be configured with other shapes such as narrow slots, preferably aligned in an up-and-down direction. The material of wall 11 surrounding such a slot perforation may typically be dimpled inward by a distance of the order of the narrow dimension of the slot. Still other changes may be made in the construction of a utensil of this type without departing from the teaching of this invention, as defined in the following claims.

I claim:

1. A utensil for cooking food by steaming, said utensil comprising a boiler and a food holder, wherein:
   (a) said boiler has a lower region in which an aqueous liquid may be boiled to produce steam;
   (b) said food holder has a wall extending to an upper level, said wall and said upper level defining a holder volume, within said food holder, in which said food may be held above said lower region;
   (c) said wall has at least one perforation through which said steam may pass from said lower region to said holder volume to cook said food by steaming;
   (d) said at least one perforation is above a lower level, said wall and said lower level defining a sump volume within said food holder; and
   (e) said sump volume is at least 0.1% of said holder volume.

2. A utensil according to claim 1 wherein said sump volume is at least 10% of said holder volume.

3. A utensil according to claim 1 wherein:
   (a) said boiler has a top;
   (b) said wall of said food holder engages said top to support said food holder upon said boiler;
   (c) a portion of said wall is received within said boiler below said top and above said lower region; and
   (d) said at least one perforation is in said received portion of said wall.

4. A utensil according to claim 1 wherein:
   (a) said food holder is disposed entirely within said boiler;
   (b) said food holder has legs fastened to said wall; and
   (c) said legs rest internally upon said boiler to support said food holder above said lower region.

5. A utensil according to claim 1 wherein said at least one perforation is a narrow slot, the longer dimension of which is aligned substantially perpendicular to the horizontal.

6. A utensil according to claim 1 wherein said wall, at the location of said at least one perforation, is dimpled inwardly by a distance of the order of the minimum dimension of said at least one perforation.

7. A food holder, for use as a component of a utensil for cooking food by steaming, in which:
   (a) said food holder has a wall extending to an upper level, said wall and said upper level defining a holder volume, within said food holder, in which said food may be held;
   (b) said wall has at least one perforation through which steam may enter said holder volume to cook said food by steaming;
   (c) said at least one perforation is above a lower level, said wall and said lower level defining a sump volume within said food holder; and
   (d) said sump volume is at least 0.1% of said holder volume.

8. A food holder according to claim 7 wherein said sump volume is at least 10% of said holder volume.

9. A food holder according to claim 7 wherein said at least one perforation is a narrow slot, the longer dimension of which is aligned substantially perpendicular to the horizontal.

10. A food holder according to claim 7 wherein said wall at the location of said at least one perforation, is dimpled inwardly by a distance of the order of the minimum dimension of said at least one perforation.

* * * * *